July 14, 1959 — C. A. RASMUSSEN — 2,894,443
MULTIPLE PASSAGE SUPPLY DUCT
Filed June 25, 1956
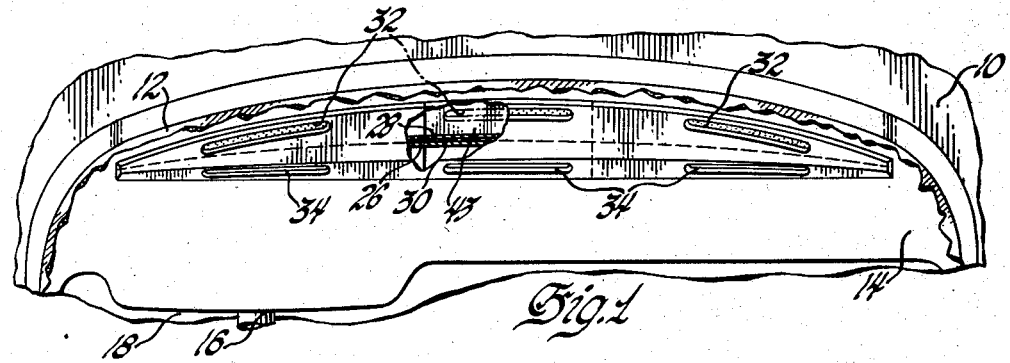
Fig. 1
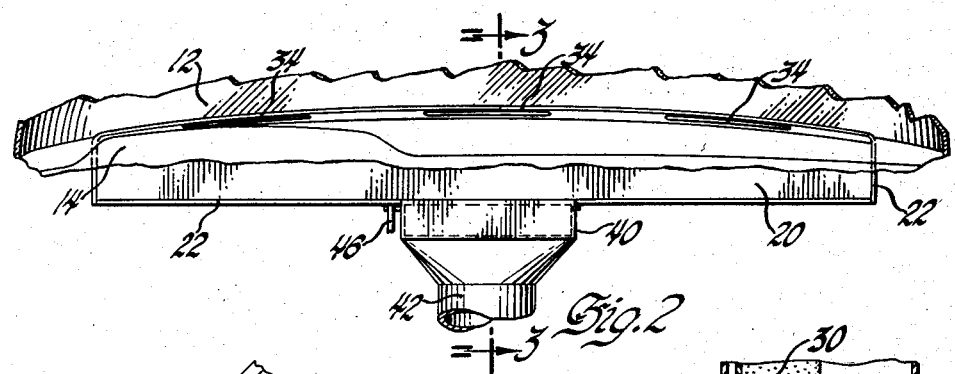
Fig. 2
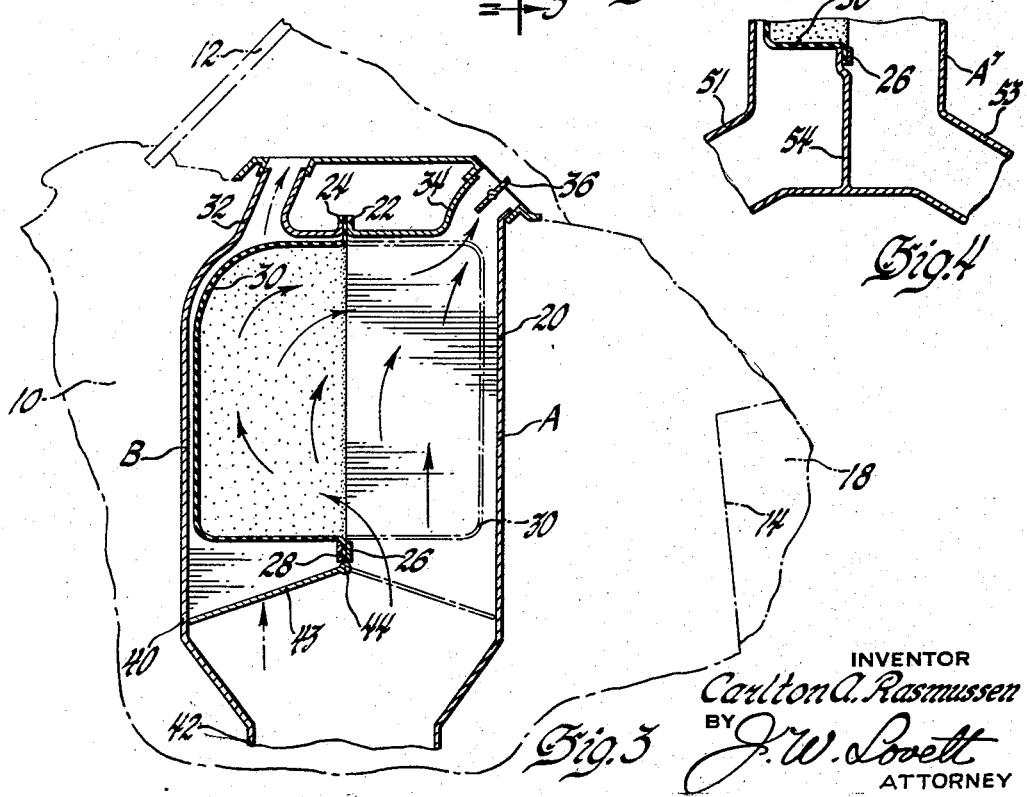
Fig. 3
Fig. 4
INVENTOR
Carlton A. Rasmussen
BY J. W. Lovett
ATTORNEY United States Patent Office 2,894,443
Patented July 14, 1959

2,894,443

MULTIPLE PASSAGE SUPPLY DUCT

Carlton A. Rasmussen, Franklin, Mich., assignor to General Motors Corporation, Detroit, Mich., a corporation of Delaware Application June 25, 1956, Serial No. 593,691

7 Claims. (Cl. 98—2)

This invention relates to ducts and more particularly to ducts for supplying a fluid such as air from a source of supply through a restricted zone to outlets providing different services such as vehicle windshield defrosting and heating, ventilating or cooling the passenger compartments in vehicles.

In modern automotive vehicles the zone between the fire wall and the instrument panel beneath the windshield is highly restricted because of the presence of radio equipment, the usual arrangement of instruments, wiring and other elements. As a result, there is very little room for adequate air passages or conduits leading to windshield defroster nozzles or to distributing outlets for heated or conditioned air. As a result, air conduits concealed by the instrument panel for defrosting, heating, ventilating or air conditioning are not as large as desirable and, as a result, the flow of air is unduly restricted for proper distribution. It would be desirable, therefore, to provide a single duct which would retain its large capacity for flow and at the same time serve the purpose of multiple ducts as heretofore utilized in providing fluid for separate services.

An object of the present invention is to provide an improved duct capable of accommodating adequate fluid flow through a restricted zone for each of separate services or objectives.

Another object of the invention is to provide a duct having separate flow passages and in which each passage may have an effective cross-sectional area approaching that of the duct itself.

A feature of the invention is a duct having an inlet and multiple outlets and a flexible membrane partitioning the interior of said duct into passages each leading from an inlet to at least one of said outlets. Another feature is an elongated duct having groups of outlets served by separate inlets and being concealed by the instrument panel of an automotive vehicle with a flexible membrane and being adapted to cooperate with means associated with the duct so that air may be directed along either side of the membrane. Another feature is a duct having expansible and contractable passages adapted to extend through a restricted zone.

These and other important features of the invention will now be described in detail in the specification and then pointed out more particularly in the appended claims.

In the drawings:

Fig. 1 is a plan view of the instrument panel and windshield portion at the cowl of an automobile, parts being broken away better to illustrate the invention;

Fig. 2 is an elevation view of the structure shown in Fig. 1 looking forwardly from the passenger compartment, portions of the windshield and instrument panel being broken away;

Fig. 3 is a sectional view taken along the line 3—3 of Fig. 2 and drawn to an enlarged scale; and Fig. 4 is a sectional and partial view of a modified structure embodying the invention.

In the drawings, a portion of a vehicle 10 is shown with a conventional windshield 12 and instrument panel 14. The steering column is shown at 16 as extending into the passenger compartment 18.

An elongated duct 20 of rigid material is concealed by the instrument panel 14 and extends transversely of the vehicle beneath the windshield 12. This duct is made of two main portions or halves A and B which are flanged at their peripheries as at 22 and 24, respectively. As best seen in Fig. 1, the forward wall of the duct is arcuate and the ends of the duct are reduced in size. The duct 20 also includes two elongated members 26 and 28 which are in alignment with the flanges 22 and 24 at the intermediate bottom portion of the duct and cooperate with those flanges to clamp the complete periphery of a flexible diaphragm 30. This diaphragm may be of substantially impermeable fabric or of a rubbery composition permitting flexibility and yielding for a purpose to be further described herein. It will be understood that the flanges 22 and 24 extend along the top and down the ends of the duct 20 so that they cooperate with the members 26 and 28 to make a complete peripheral seal with the membrane.

The top portion of the duct is provided with multiple outlets. One group of outlets 32 is represented by three outlets arranged arcuately and directed toward the windshield 12. A second group of outlets 34 is directed upwardly and rearwardly into the passenger compartment 18 and each of the latter outlets may be provided with a rotatable vane such as the vane 36 whereby the air discharged may be deflected to follow desired directions. The vanes 36 play no part in the present invention and it will be appreciated that any of several forms of direction modifying discharge devices, auxiliary ducts or nozzles may be used in association with each of the outlets 34.

The bottom of the duct 20 is fitted with a casing or inlet 40 communicating with a conduit 42 of reduced cross-section which is adapted to receive conditioned air from a heating system or an air conditioning system evaporator. Located within the inlet 40 is a valve 43 mounted on a shaft 44 which extends through the opposite walls of the inlet 40 for operation by a control member or crank 46. The valve 43 is so proportioned that it will cut off or open communication of the inlet with either side of the diaphragm 30.

In operation of the duct and with the valve 43 placed in the position indicated in solid lines in Fig. 3, air introduced to the inlet 40 will be directed upwardly into the side portion A of the duct 20 for discharge through the outlets 34. As a consequence, the membrane 30 will assume the position indicated in solid lines in Fig. 3, and the effective cross-sectional area for air flow to the outlets 34 approaches that of the complete duct 20 and provides a more even distribution of the air to the second outlets 34.

In the event that windshield defrosting is required, the valve 43 is placed in the position indicated by dash lines in Fig. 3. As a result, air will flow upwardly and into the duct portion B on the forward side of the membrane 30 and then to the defroster outlets 32. The air pressure generated in the part B of the duct 20 will cause the membrane 30 to assume the position indicated in dash lines in Fig. 3, and again a large effective cross-sectional area is availed of to facilitate the flow of air.

From the above, it will be seen that the membrane 30 adapts itself automatically and in accordance with the setting of the valve 43. The zone concealed by the panel 14 is restricted, but the membrane 30 permits full air flow to either group of outlets—the effect being that one duct does substantially the work of two ducts in serving the purposes of defrosting or air conditioning, as examples.

In the construction shown in Fig. 4, a modified duct A' is depicted which includes a central rib 54 for supporting the lower edge of the flexible diaphragm 30. The duct A' also is provided with two inlets or conduits 51 and 53 adapted to serve as fluid conduits leading from different sources of supply. Conduit 53 may be connected to an evaporator whereby cooled air is supplied by a blower for passage through the duct A'. The conduit 51 may be connected to a heater to receive heated air for defrosting the windshield 12. With such an arrangement there is no need for a valve 43 as shown in Fig. 3. Pressure of air introduced from the evaporator or heater will cause the diaphragm 30 suitably to yield and adequately supply the proper duct outlets with air.

I claim:

1. A duct having an inlet and multiple open outlets, a flexible membrane partitioning the interior of said duct into separate multiple passages interposed between the said inlet and the said outlets and each leading from said inlet to at least one of said open outlets, said membrane being distortionable under pressure to vary the cross-sectional dimensions of said passages, and valve means associated with said inlet controlling communication of said inlet to either side of said membrane to effect a direct flow of fluid through the duct.

2. A duct of elongated configuration having an inlet at one side and multiple outlets at another side, said outlets being open and spaced along the length of said duct, a flexible membrane extending along the duct and partitioning the interior thereof into separate multiple passages each leading from said inlet to some of said open outlets and being variable in cross-section upon yielding of said membrane under the influence of fluid pressure, and manually actuated valve means associated with said inlet to direct fluid flow to either side of said membrane.

3. An elongated duct having an inlet and multiple open outlets extending along its length, said duct being located forward of and substantially parallel with an instrument panel in an automotive vehicle, said outlets being grouped to perform different services, a flexible membrane distortionable by fluid pressure and partitioning the interior of said duct into two separate passages each leading from said inlet to one of the groups of outlets, and valve means associated with said inlet to control fluid flow to either side of said membrane.

4. A duct having an inlet on one side and multiple open outlets at an opposite side, said outlets being grouped to perform different services, a membrane partitioning the interior of said duct into separate multiple passages each leading from said inlet to at least one group of said open outlets, said membrane being impermeable and distortionable when subjected to fluid pressure, and valve means associated with said inlet to control fluid flow through said inlet to either side of said membrane whereby a continuous flow of fluid through said duct may be effected.

5. An elongated duct concealed by the instrument panel of an automotive vehicle having a windshield and a passenger compartment, said duct having an inlet and groups of outlets, one of said groups of outlets being arranged to direct defrosting air toward said windshield, another of said groups of outlets being adapted to direct conditioned air to said passenger compartment, a flexible and distortionable membrane partitioning the interior of said duct into two separate passages each leading from said inlet to one of said groups of outlets, and valve means associated with said inlet to direct air under pressure to either side of said membrane.

6. A duct having multiple inlets and open outlets, a flexible membrane partitioning the interior of said duct into two separate passages each leading from at least one of said inlets to at least one of said open outlets, and said membrane being distortionable under pressure to vary the cross-sectional dimension of either of said passages to approach the dimensions of said interior.

7. A duct extending along the instrument panel of a vehicle and having two inlets and multiple open outlets, said outlets being grouped to perform different services, a membrane partitioning the interior of said duct into two separate passages each leading from one of said inlets to one group of said outlets, and said membrane being distortionable when subject to pressure of fluid admitted through either of said inlets thereby increasing the flow capacity of the corresponding passage.

References Cited in the file of this patent

UNITED STATES PATENTS

| | | |
|---|---|---|
| 146,469 | Nicolas et al. | Jan. 13, 1874 |
| 285,175 | Stickney | Sept. 18, 1883 |
| 1,871,044 | Crosthwait et al. | Aug. 9, 1932 |
| 1,938,559 | Hueber | Dec. 5, 1933 |
| 2,729,158 | Wilfert | Jan. 3, 1956 |
| 2,738,718 | Reynolds | Mar. 20, 1956 |